United States Patent [19]
Minakawa

[11] Patent Number: 4,798,396
[45] Date of Patent: Jan. 17, 1989

[54] WHEEL SUSPENSION SYSTEM FOR AUTOMOBILES

[75] Inventor: Masaaki Minakawa, Wako, Japan

[73] Assignee: Honda Giken Kogyo Kabushiki Kaisha, Tokyo, Japan

[21] Appl. No.: 65,731

[22] Filed: Jun. 24, 1987

[30] Foreign Application Priority Data

Jun. 27, 1986 [JP] Japan ............................ 61-151130
Feb. 5, 1987 [JP] Japan ............................ 62-25102

[51] Int. Cl.⁴ .............................................. B60G 3/00
[52] U.S. Cl. .................................... 280/673; 280/675; 280/671
[58] Field of Search ............... 280/673, 674, 675, 96.1, 280/691, 696, 663, 666, 671

[56] References Cited

U.S. PATENT DOCUMENTS

| | | | |
|---|---|---|---|
| 3,551,990 | 1/1971 | Wehner | 280/673 |
| 3,883,152 | 5/1975 | Carbon | 280/675 |
| 4,515,390 | 5/1985 | Greenberg | 280/675 |
| 4,538,831 | 9/1985 | Kami et al. | 280/696 |
| 4,591,184 | 5/1986 | Matschinsky | 280/675 |

FOREIGN PATENT DOCUMENTS 3022055 12/1981 Fed. Rep. of Germany.
28123 11/1969 Japan.

Primary Examiner—Richard A. Bertsch
Attorney, Agent, or Firm—Armstrong, Nikaido Marmelstein Kubovcik

[57] ABSTRACT

A wheel suspension system for automobiles, which comprises a pair of upper and lower control arms connected at their leading ends to a knuckle for carrying a wheel and having base ends each of which is vertically swingably pivoted respectively at front and rear spaced positions to a vehicle body, wherein a pair of upper and lower support arms are projectingly mounted on a vertical support shaft which is carried on the vehicle body through elastic members, and either of front and rear portions of respective base ends of the upper and lower control arms are connected respectively to the upper and lower support arms. This makes it possible to assure a larger caster rigidity during braking while providing a large longitudinal compliance.

7 Claims, 4 Drawing Sheets

WHEEL SUSPENSION SYSTEM FOR AUTOMOBILES

BACKGROUND OF THE INVENTION

1. Field of the Invention

The present invention relates to a wheel suspension system for automobiles, and particularly to an improvement in a wheel suspension system which comprises a pair of upper and lower control arms connected at their leading ends to a knuckle which carries a wheel, each of the base ends of the arms being vertically swingably pivoted respectively at front and rear spaced positions to a vehicle body.

2. Description of the Prior Art

Such wheel suspension systems are well known as a double wishbone type (for example, see Japanese Patent Publication No. 28123/69).

In such conventional wheel suspension system, the upper and lower control arms are pivoted at their base ends respectively through elastic members to horizontal shafts fixedly mounted on a vehicle body. Therefore, the longitudinal compliance and caster rigidity during braking are governed by spring constants of these elastic members.

In general, in order to prevent shocks from being transmitted to the vehicle body to the utmost, such as shocks generated when a wheel gets over a protrusion on a road surface, it is necessary to provide the wheel suspension system with a large longitudinal compliance. And in order to assure a straight advancing property of a wheel during braking, it is necessary to give a large caster rigidity to the wheel suspension system.

In the conventional wheel suspension system, however, if the spring constant of an elastic member is set at a smaller value for providing a larger longitudinal compliance, the caster rigidity is reduced to degrade the straight advancing property of the wheel. On the contrary, if the spring constant of the elastic member is set at a larger value to provide a larger caster rigidity during braking, the longitudinal compliance is reduced, accompanied by an adverse deterioration of the riding comfort. Consequently, it is difficult to satisfy both of the longitudinal compliance and the caster rigidity during braking.

SUMMARY OF THE INVENTION

The present invention has been accomplished with such circumstances in view, and it is an object of the present invention to provide a wheel suspension system of the type described above, which can satisfy both the longitudinal compliance and the caster rigidity during braking.

According to the present invention, the above object is attained by providing a wheel suspension system for automobiles comprising a pair of upper and lower control arms connected at their leading ends to a knuckle which carries a wheel and each having a base thereof vertically swingably pivoted at front and rear spaced positions to a vehicle body, wherein a substantially vertical support shaft is provided to have a pair of upper and lower support arms projected therefrom, the support shaft being carried on the vehicle body through elastic members, and wherein either of front and rear portions of the respective base ends of the upper and lower control arms are connected respectively to the upper and lower support arms.

With such construction, if a load in the longitudinal direction of the vehicle is applied to a central portion of the knuckle, then the upper and lower control arms apply respective rotational moments in the same direction to the support shaft and hence, the total rotational moment received by the support shaft is large. On the other hand, if a braking force is applied to a point of contact of tire with ground, then the upper and lower control arms apply rotational moments in the opposite directions to the support shaft, so that these moments work to negate each other, resulting in a total rotational moment applied to the support shaft being zero or slight. Accordingly, even if the spring constant of an elastic member for supporting the support shaft is set at a smaller value in order to provide a larger longitudinal compliance, a larger caster rigidity can be assured during braking. This makes it possible to satisfy both the shock absorbing property during vehicle travelling on a rough road surface and the straight advancing property during braking.

The above and other objects, features and advantages of the invention will become apparent from reading of the following description of the preferred embodiments, taken in conjunction with the accompanying drawings.

BRIEF DESCRIPTION OF THE DRAWINGS

Drawings illustrate embodiments of the present invention, wherein.

DESCRIPTION OF THE PREFERRED EMBODIMENTS

Figure 1:
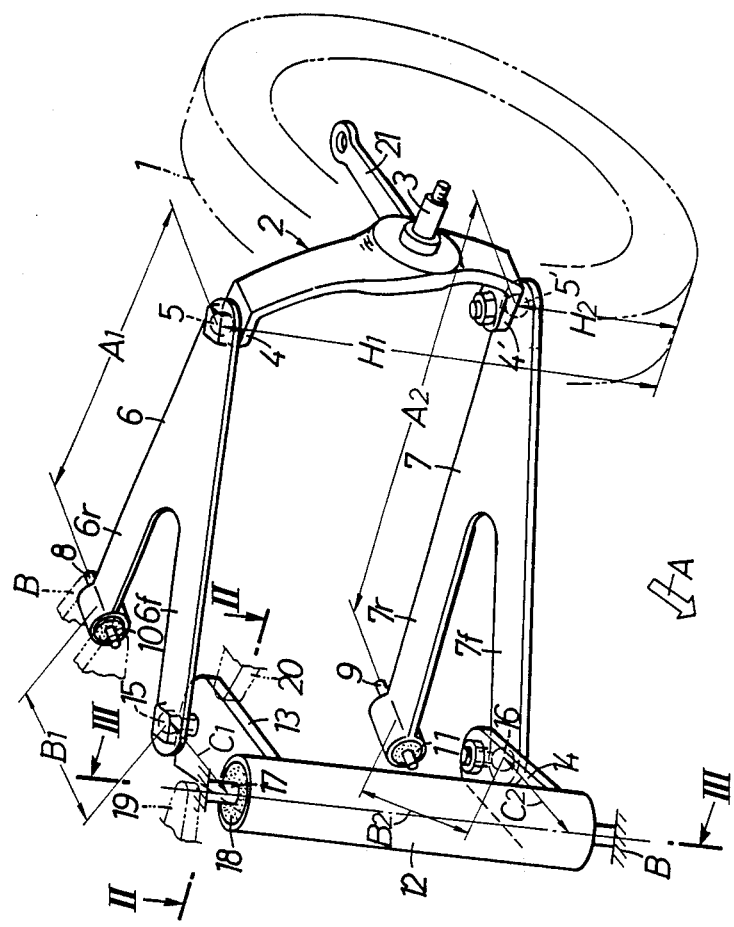
FIG. 1 is a perspective view of the whole of a wheel suspension system according to the present invention.

The present invention will now be described in more detail by way of embodiments with reference to the accompanying drawings. Referring first to FIG. 1, there is shown a wheel suspension system for vehicles according to a first embodiment of the present invention, which includes a knuckle 2 for carrying a wheel 1. The knuckle 2 comprises a spindle 3 for supporting the wheel 1 through a bearing (not shown), and bifurcated arms 4 and 4' branched to upwardly and downwardly extend from a base end of the spindle 3. An upper control arm 6 and a lower control arm 7 are connected at their leading ends to the bifurcated arms 4 and 4' through ball joints 5 and 5', respectively. A caster for the wheel 1 is determined by an inclination of a straight line connecting the respective centers of the ball joints 5 and 5'.

The upper control arm 6 is diverged at its base end into a pair of front and rear arm portions 6f and 6r, while the lower control arm 7 is also diverged at its base end into a pair of front and rear arm portions 7f and 7r. The rear arm portions 6r and 7r are vertically swingably carried respectively through elastic members 10 and 11 on pivot shafts 8 and 9 which are secured to a vehicle body B so as to extend longitudinally of the body B. Both control arms 6 and 7 are suspended and resiliently biased downwardly with respect to the body B spring means not shown.

Figure 3:
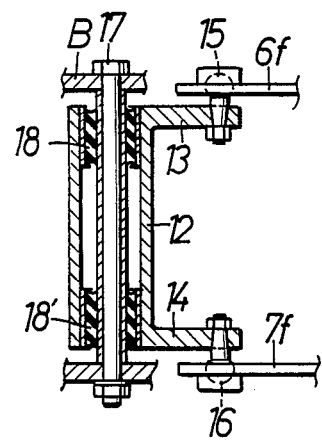

A tubular support shaft 12 is disposed in front of and adjacent the front arm portions 6f and 7f and is rotatably supported through elastic members 18, 18' on a pivot shaft 17 which has opposite ends secured to the body B and extends substantially vertically (see FIG. 3). A pair of upper and lower support arms 13 and 14 are integrally prospected rearwardly from the outer surface of the tubular shaft 12, and the front arm portions 6f and 7f are connected to the support arms 13 and 14 through ball joints 15 and 16, respectively.

Here, if an effective length of the upper control arm 6 is represented by $A_1$; an effective length of the lower control arm 7 is by $A_2$; a distance between fulcrums at the base ends of the front and rear arms 6f and 6r in the upper control arm 6 is by $B_1$; a distance between fulcrums at the base ends of the front and rear arms 7f and 7r in the lower control arm 7 is by $B_2$; an effective length of the upper support arm 13 is by $C_1$; an effective length of the lower support arm 14 is by $C_2$; a height of the connection at the fore end of the upper control arm 6 from the ground is by $H_1$; and a height of the connection at the fore end of the lower control arm 7 from the ground is by $H_2$, in order to permit the wheel suspension system to fully exhibit its intended function, these dimensions will be set so as to establish the following expression:

$$\frac{A_2 \cdot C_2}{B_2} \bigg/ \frac{A_1 \cdot C_1}{B_1} \simeq H_2/H_1 \quad (1)$$

Figure 2:
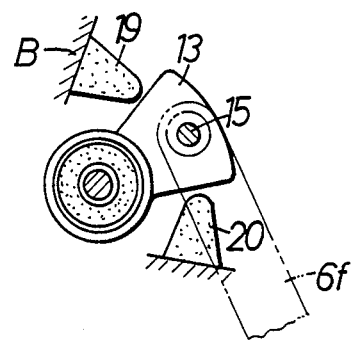
FIGS. 2 and 3 are sectional views taken along lines II—II and III—III in FIG. 1, respectively.

As shown in FIG. 2, a pair of elastic stoppers 19 and 20 are secured to the body B in an opposed relation with predetermined distances to laterally opposite sides of the upper support arm 13, so that rotational angle of the tubular shaft 12 is limited by the support arm 13 coming into abutment against the stoppers 19 and 20.

It is noted that the reference numeral 21 in FIG. 1 designates a knuckle arm mounted on the knuckle 2. The knuckle arm 21 may be connected to a steering mechanism if the wheel 1 is a front wheel, or otherwise it may be supported on the vehicle body if the wheel 1 is a rear wheel. An arrow A indicates the forward or advancing direction of a vehicle.

Description will now be made of the operation of this embodiment.

Figure 4:
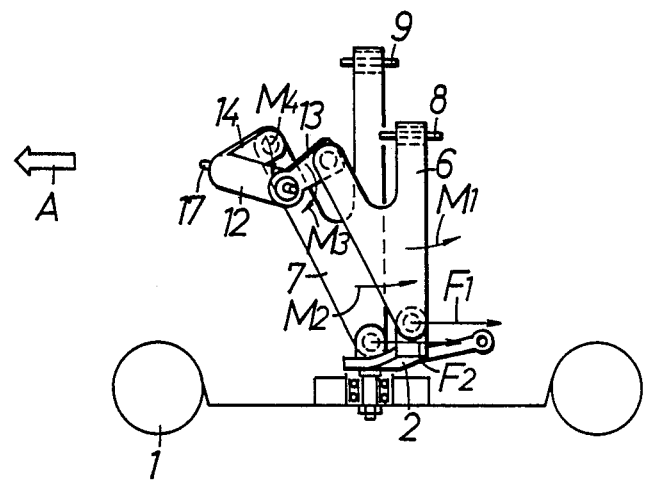
FIGS. 4 and 5 are respective plan and side views for explaining an operation when a wheel moves up a protrusion on a road surface.
Figure 5:
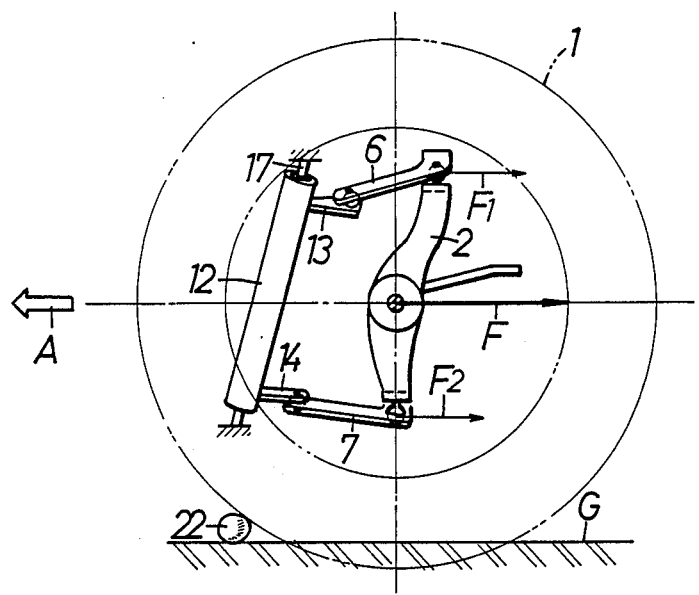

Referring first to FIGS. 4 and 5, suppose that the wheel 1 passes a protrusion 22 such as a pebble on a road surface G during travelling of a vehicle. When the wheel 1 gets over the protrusion 22, a rearward component F of the force applied from the protrusion 22 to the knuckle 2 is resolved into parallel force components $F_1$ and $F_2$ by the bifurcated arms 4 and 4' to act on the leading ends of the upper and lower control arms 6 and 7. Consequently, the control arms 6 and 7 receive rearward moments $M_1$ and $M_2$ and thus apply rotational moments $M_3$ and $M_4$ in the same direction to the support arms 13 and 14 of the tubular shaft 12 while deforming the elastic members 10 and 11 at the respective base ends thereof, respectively. Accordingly, the total rotational moment M3+M4 received by the tubular shaft 12 is large, and the elastic members 18 and 18' for supporting the tubular shaft 12 can be easily deformed upon receiving a large torsional force, so that both of the upper and lower control arms 6 and 7 can be relatively easily inclined rearwardly of the vehicle by the aforesaid component F of force. In this way, a large longitudinal compliance is applied to the wheel suspension system and this makes it possible to moderate an impact force from the protrusion 22 and to prevent it from being transmitted to the vehicle body.

The upward and downward movements of the front wheel 1 on passing the protrusion 22 are permitted by the vertically swinging movements of the upper and lower control arms 6 and 7 about the corresponding pivot shafts 8 and 9 and the corresponding ball joints 15 and 16.

Figure 6:
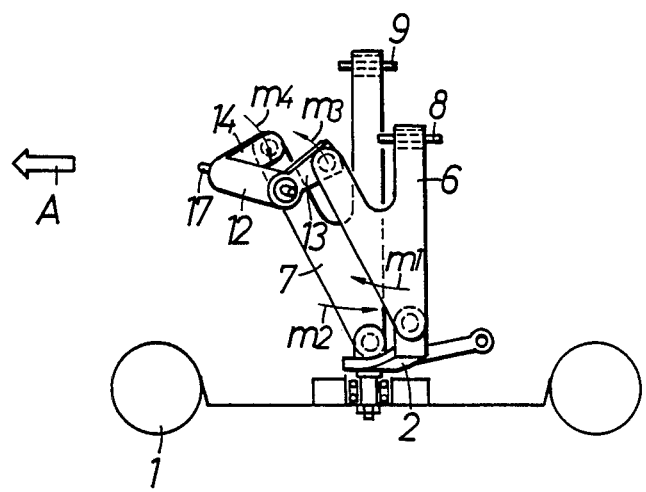
FIGS. 6 and 7 are respective plan and side views for explaining an operation during braking.
Figure 7:
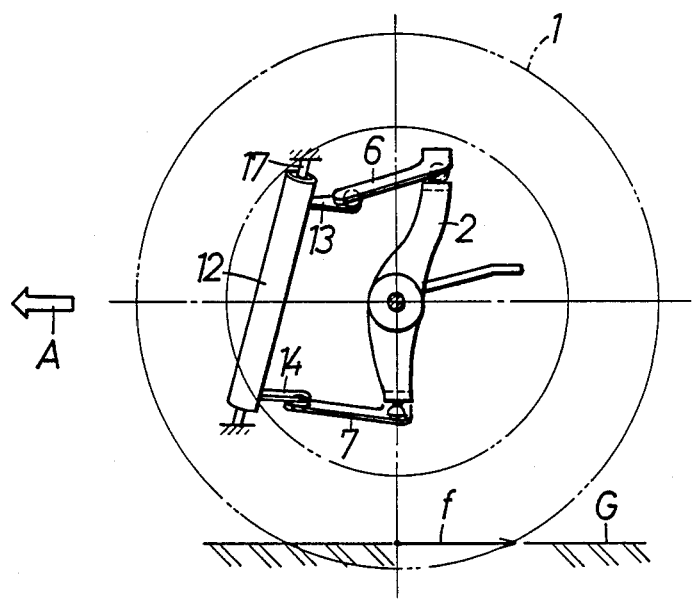

Then, referring to FIGS. 6 and 7, suppose that the wheel 1 has been braked by the operation of a braking system (not shown) during travelling of the vehicle. When the wheel 1 has been braked, a forward moment $m_1$ is applied to the upper control arm 6 and a rearward moment $m_2$ acts on the lower control arm 7 by a frictional braking force f applied to the front wheel 1 from the road surface G. Consequently, the upper control arm 6 applies a counterclockwise rotational moment $m_3$ as viewed in FIG. 6 to the upper support arm 13 of the tubular shaft 12, whereas the lower control arm 7 applies a clockwise moment $m_4$ to the lower support arm 14 of the tubular shaft 12. In this way, the rotational moments $m_3$ and $m_4$ applied to the support arms 13 and 14 act in just opposite directions and hence, negate each other through the tubular shaft 12. Thus, the total rotational moment acting on the tubular shaft 12 becomes approximately zero under the establishment of the above-described expression (1). As a result, the upper and lower control arms 6 and 7 can be kept from being moved forwardly or rearwardly to prevent displacement of the knuckle 2 against the frictional force f of the road surface G. Therefore, even if a tire has run onto the protrusion during braking, the longitudinal compliance can be kept at a level not different from that during non-braking. This is convenient when a priority is given to the riding comfort.

A second embodiment will be described below.

A wheel suspension system according to a second embodiment is of a construction similar to that of the first embodiment, except that dimensions of the individual parts are set to satisfy the following expression:

$$\frac{A_1 \cdot C_1}{B_1} \simeq \frac{A_2 \cdot C_2}{B_2} \quad (2)$$

The operation of this embodiment will be described below. When the wheel 1 passes a protrusion 2 such as pebbles on the road surface G, the total rotational moment received by the tubular shaft 12 becomes large like the first embodiment and hence, a large longitudinal compliance is achieved. When the wheel 1 has been braked by the operation of the braking system during travelling of the vehicle, the total rotational moment acting on the tubular shaft 12 is small. Further, even if the upper and lower control arms 6 and 7 are moved by the action of this total rotational moment, the amounts of movements of those arms are equal to each other in accordance with the satisfaction of the above expression (2). Consequently, the caster does not vary and hence, a large caster rigidity can be obtained. This is convenient when a priority is given to the straight advancing property.

While the illustrated embodiments show support shaft 12 connected with the front arm portions 6f, 7f of the control arms 6, 7, modifications may be made to connect the shaft 12 with the rear arm portions 6r, 7r of the control arms 6, 7, instead.

What is claimed is:

1. A wheel suspension system for an automobile, comprising:
   a pair of upper and lower control arms each having a leading end and a base end, the leading ends of the control arms being connected to a knuckle carrying a vehicle wheel;
   a pivot shaft fixedly supported on a vehicle body;
   a support shaft rotatably supported on said pivot shaft by elastic members;
   a pair of upper and lower support arms projecting from respective upper and lower portions of said support shaft, wherein the base ends of said control arms are each diverged into front and rear arm portions spaced apart from each other in a longitudinal direction of the vehicle body, such that one of the front and rear arm portions of said base ends are vertically swingably pivoted to the vehicle body, while the other of said front and rear arm portions of the base ends of the control arms are connected to said pair of upper and lower support arms.

2. The wheel suspension system of claim 1, further comprising stoppers provided on the vehicle body in a manner facing opposite lateral sides of each of said upper and lower support arms with predetermined distances therebetween.

3. The wheel suspension system of claim 2, wherein the other of said front and rear arm portions are the front arm portions of the base ends.

4. The wheel suspension system of claim 1, wherein the other of the front and rear arm portions of the base ends are connected to the pair of upper and lower support arms via ball joints, respectively.

5. The wheel suspension system of claim 1, wherein said support shaft has a tubular shape with a hollow interior therein, said pivot shaft penetrating through the interior of the support shaft with said elastic members interposed therebetween.

6. The wheel suspension system of claim 1, wherein when an effective length of the upper control arm is represented by $A_1$; an effective length of the lower control arm is by $A_2$; a distance between front and rear fulcrums at the base ends of the upper control arm is represented by $B_1$; a distance between front and rear fulcrums at the base ends of the lower control arm is represented by $B_2$; an effective length of the upper support arm is represented by $C_1$; an effective length of the lower support arm is represented by $C_2$; a height of a connection at the leading end of the upper control arm from the ground is represented by $H_1$; and a height of a connection at the leading end of the lower control arm from the ground is represented by $H_2$, the following relationship:

$$\frac{A_2 \cdot C_2}{B_2} \bigg/ \frac{A_1 \cdot C_1}{B_1} \simeq H_2/H_1$$

is established.

7. The wheel suspension system of claim 1, wherein when an effective length of the upper control arm is represented by $A_1$; an effective length of the lower control arm is represented by $A_2$; a distance between front and rear fulcrums at the base ends of the upper control arm is represented by $B_1$; a distance between front and rear fulcrums at the base ends of the lower control arm is represented by $B_2$; an effective length of the upper support arm is represented by $C_1$; an effective length of the lower support arm is represented by $C_2$, the following relationship:

$$\frac{A_1 \cdot C_1}{B_1} \simeq \frac{A_2 \cdot C_2}{B_2}$$

is established.

* * * * *